(12) United States Patent
Sharma et al.

(10) Patent No.: US 10,860,067 B2
(45) Date of Patent: Dec. 8, 2020

(54) MOBILE COMPUTING DEVICE, APPARATUS AND SYSTEM

(71) Applicant: Intel Corporation, Santa Clara, CA (US)

(72) Inventors: Sameer Sharma, Santa Clara, CA (US); Gad Amit, San Mateo, CA (US); Yoshikazu Hoshino, San Francisco, CA (US); Chadwick Harber, San Francisco, CA (US); Daniel Clifton, San Francisco, CA (US); Kenneth Jasinski, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/419,635

(22) Filed: Jan. 30, 2017

(65) Prior Publication Data
US 2017/0139448 A1    May 18, 2017

Related U.S. Application Data

(63) Continuation of application No. 13/976,461, filed as application No. PCT/US2012/022403 on Jan. 24, 2012, now abandoned.

(51) Int. Cl.
*G06F 1/16*   (2006.01)

(52) U.S. Cl.
CPC ........... *G06F 1/1681* (2013.01); *G06F 1/162* (2013.01); *G06F 1/1626* (2013.01);
(Continued)

(58) Field of Classification Search
None
See application file for complete search history.

(56) References Cited

U.S. PATENT DOCUMENTS

| 3,286,850 A | 11/1966 | Ruhnke |
| 4,326,727 A | 4/1982 | Rock |

(Continued)

FOREIGN PATENT DOCUMENTS

| CN | 1238491 | 12/1999 |
| CN | 1238491 A | 12/1999 |

(Continued)

OTHER PUBLICATIONS

PCT International Search Report and Written Opinion Received for PCT Patent Application No. PCT/US2012/022403 dated Oct. 25, 2012.

(Continued)

*Primary Examiner* — Courtney L Smith
*Assistant Examiner* — Rashen E Morrison
(74) *Attorney, Agent, or Firm* — Patent Capital Group

(57) ABSTRACT

Embodiments of an apparatus, system and method are described for a mobile computing device. A mobile computing device may comprise, for example, an enclosure arranged to support a display and one or more processor circuits, the enclosure having an enlarged portion at one side of the enclosure arranged to allow a user to clutch the enclosure with one hand at the one side, the enlarged portion having a thickness that is larger than a thickness of another portion of the enclosure, and the enlarged portion defining a cavity arranged to support one or more energy storage modules. Other embodiments are described and claimed.

25 Claims, 13 Drawing Sheets

(52) U.S. Cl.
CPC .......... *G06F 1/1635* (2013.01); *G06F 1/1643* (2013.01); *G06F 1/1654* (2013.01); *G06F 1/1662* (2013.01); *G06F 1/1684* (2013.01); *G06F 1/1686* (2013.01); *G06F 1/1692* (2013.01); *G06F 1/169* (2013.01)

(56) References Cited

U.S. PATENT DOCUMENTS

| | | | |
|---|---|---|---|
| D310,209 | S | 8/1990 | Kasprzycki |
| D310,543 | S | 9/1990 | Brown |
| 5,200,913 | A | 4/1993 | Hawkins et al. |
| 5,253,139 | A | 10/1993 | Satou |
| D358,376 | S | 5/1995 | Poon |
| 5,583,744 | A | 12/1996 | Oguchi |
| D386,751 | S | 11/1997 | Michael |
| 5,808,862 | A | 9/1998 | Robbins |
| D399,526 | S | 10/1998 | Brady |
| 5,818,691 | A | 10/1998 | McMahan |
| 5,870,283 | A | 2/1999 | Maeda |
| D430,871 | S | 9/2000 | Chu et al. |
| 6,128,184 | A | 10/2000 | Ito et al. |
| D436,951 | S | 1/2001 | Andresen |
| 6,191,941 | B1 * | 2/2001 | Ito ................ G06F 1/1616 312/223.1 |
| 6,252,767 | B1 * | 6/2001 | Carlson ............. G06F 1/1616 292/148 |
| 6,282,082 | B1 | 8/2001 | Armitage |
| 6,366,459 | B1 | 4/2002 | Katagiri |
| 6,452,795 | B1 | 9/2002 | Lee et al. |
| 6,530,784 | B1 | 3/2003 | Yim |
| 6,590,547 | B2 | 7/2003 | Moriconi |
| 6,628,267 | B2 | 9/2003 | Karidis et al. |
| 6,693,367 | B1 | 2/2004 | Schmeisser et al. |
| 6,700,773 | B1 | 3/2004 | Adriaansen |
| 6,700,775 | B1 * | 3/2004 | Chuang ............. G06F 1/1626 361/679.01 |
| D493,456 | S | 7/2004 | Ogasawara |
| D494,948 | S | 8/2004 | Cho |
| 6,778,382 | B2 | 8/2004 | Yim |
| 6,780,019 | B1 | 8/2004 | Ghosh |
| 6,788,527 | B2 | 9/2004 | Doczy et al. |
| 6,894,893 | B2 | 5/2005 | Hidesawa |
| D506,767 | S | 6/2005 | Imai |
| 6,952,340 | B2 | 10/2005 | Son |
| 6,952,343 | B2 | 10/2005 | Sato |
| D516,578 | S | 3/2006 | Matsuoka |
| 7,025,274 | B2 | 4/2006 | Solomon |
| D519,967 | S | 5/2006 | Wei et al. |
| 7,052,296 | B2 | 5/2006 | Yang |
| 7,061,472 | B1 | 6/2006 | Schweizer |
| D524,306 | S | 7/2006 | Yun et al. |
| 7,085,132 | B2 | 8/2006 | Schlesener |
| D529,910 | S | 10/2006 | Ota |
| 7,196,901 | B2 | 3/2007 | Maskatia |
| 7,206,196 | B2 | 4/2007 | Ghosh |
| 7,286,344 | B2 | 10/2007 | Kim et al. |
| 7,320,451 | B2 | 1/2008 | Ogawa |
| D565,047 | S | 3/2008 | Jawerth |
| 7,345,871 | B2 | 3/2008 | Lev |
| D566,181 | S | 4/2008 | Gerules |
| D580,433 | S | 11/2008 | Chiang et al. |
| 7,489,507 | B2 | 2/2009 | Karashima |
| 7,508,658 | B2 | 3/2009 | Ling |
| 7,511,954 | B2 | 3/2009 | Tsai |
| D591,285 | S | 4/2009 | Lu |
| D593,085 | S | 5/2009 | Behar et al. |
| D593,086 | S | 5/2009 | Behar et al. |
| D593,091 | S | 5/2009 | Behar et al. |
| D605,635 | S | 12/2009 | Edahiro |
| 7,633,750 | B2 | 12/2009 | Fan |
| D611,467 | S | 3/2010 | Gou |
| D612,847 | S | 3/2010 | Clark |
| D614,602 | S | 4/2010 | Yoo |
| D615,538 | S | 5/2010 | Huang et al. |
| 7,748,634 | B1 * | 7/2010 | Zehr ................ G06F 1/1626 235/375 |
| D624,539 | S | 9/2010 | Tsai |
| D626,124 | S | 10/2010 | Chyan et al. |
| D626,341 | S | 11/2010 | Tang |
| D628,569 | S | 12/2010 | Guo |
| D630,355 | S | 1/2011 | Gulker |
| D633,149 | S | 2/2011 | Parshad |
| D636,388 | S | 4/2011 | Kawase |
| D639,802 | S | 6/2011 | Brooks |
| D640,686 | S | 6/2011 | Daniel |
| D641,021 | S | 7/2011 | Andre et al. |
| D641,748 | S | 7/2011 | Kawase |
| 7,978,466 | B2 | 7/2011 | Lewandowski |
| D643,842 | S | 8/2011 | Marshall et al. |
| 8,009,421 | B2 | 8/2011 | Misawa |
| D645,858 | S | 9/2011 | Cho |
| D649,549 | S | 11/2011 | Andre et al. |
| D656,137 | S | 3/2012 | Chung |
| 8,142,926 | B2 | 3/2012 | Ke |
| D659,693 | S | 5/2012 | TerMeer et al. |
| D661,301 | S | 6/2012 | Kim et al. |
| 8,208,245 | B2 | 6/2012 | Staats |
| D664,144 | S | 7/2012 | Akana et al. |
| D667,404 | S | 9/2012 | Akana et al. |
| 8,259,440 | B2 | 9/2012 | Lin |
| 8,289,686 | B2 | 10/2012 | Yang |
| 8,289,688 | B2 | 10/2012 | Behar et al. |
| D675,613 | S | 2/2013 | Chu et al. |
| 8,379,382 | B2 | 2/2013 | Marshall et al. |
| 8,422,210 | B2 | 4/2013 | Moser |
| 8,437,126 | B2 | 5/2013 | Holung |
| D686,613 | S | 7/2013 | Bowers |
| 8,498,100 | B1 | 7/2013 | Whitt |
| D689,467 | S | 9/2013 | Maier |
| D690,692 | S | 10/2013 | Shin |
| D691,132 | S | 10/2013 | Sharma et al. |
| D697,497 | S | 1/2014 | Lai |
| D702,681 | S | 4/2014 | Sugiyama |
| D706,261 | S | 6/2014 | Sharma et al. |
| D707,211 | S | 6/2014 | Ho |
| 8,773,850 | B2 | 7/2014 | Minaguchi |
| D710,842 | S | 8/2014 | Ho |
| D711,334 | S | 8/2014 | Roka |
| D712,401 | S | 9/2014 | Lee et al. |
| D712,867 | S | 9/2014 | Vats |
| D713,841 | S | 9/2014 | Lim |
| D713,843 | S | 9/2014 | Erdogan |
| 8,837,169 | B2 * | 9/2014 | Lu .................. H05K 9/0049 174/138 E |
| 8,847,073 | B2 * | 9/2014 | Tokunaga ......... B60R 16/0215 174/68.1 |
| 8,848,396 | B2 * | 9/2014 | Wang ................ H05K 7/142 174/138 E |
| D715,290 | S | 10/2014 | Bryan |
| 8,873,227 | B2 | 10/2014 | Whitt |
| D723,009 | S | 2/2015 | Chang |
| 8,947,376 | B2 | 2/2015 | Sirpal |
| D729,231 | S | 5/2015 | Lam |
| 9,053,250 | B2 | 6/2015 | Halim |
| 9,055,670 | B2 | 6/2015 | Su |
| D735,709 | S | 8/2015 | Daniel |
| D735,717 | S | 8/2015 | Lam |
| D740,806 | S | 10/2015 | Fujimoto |
| 9,152,187 | B2 | 10/2015 | Yeh |
| 10,484,935 | B2 * | 11/2019 | Li ................... H04W 72/1278 |
| 2001/0001859 | A1 | 5/2001 | Hawkins |
| 2003/0111366 | A1 | 6/2003 | Enners |
| 2003/0148647 | A1 | 8/2003 | Hisamatsu et al. |
| 2003/0223185 | A1 * | 12/2003 | Doczy ............... G06F 1/1626 361/679.11 |
| 2004/0001049 | A1 | 1/2004 | Oakley |
| 2005/0057516 | A1 * | 3/2005 | Ghosh ............... G06F 1/162 345/168 |
| 2005/0111182 | A1 | 5/2005 | Lin |
| 2005/0168925 | A1 | 8/2005 | Fang |
| 2006/0012565 | A1 | 1/2006 | Shiozawa et al. |
| 2006/0024107 | A1 | 2/2006 | Lyman |

(56) References Cited

U.S. PATENT DOCUMENTS

| | | | |
|---|---|---|---|
| 2006/0038795 A1* | 2/2006 | Lee | E05B 65/006 |
| | | | 345/173 |
| 2006/0133021 A1 | 6/2006 | Fan | |
| 2007/0113440 A1* | 5/2007 | Asvadi | G09F 13/22 |
| | | | 40/544 |
| 2007/0241002 A1 | 10/2007 | Wu | |
| 2008/0068786 A1 | 3/2008 | Cheng et al. | |
| 2008/0161074 A1 | 7/2008 | Fornell | |
| 2009/0201254 A1 | 8/2009 | Rais | |
| 2009/0219682 A1 | 9/2009 | Chien et al. | |
| 2009/0244012 A1* | 10/2009 | Behar | G06F 1/162 |
| | | | 345/169 |
| 2009/0244832 A1 | 10/2009 | Behar et al. | |
| 2009/0270727 A1 | 10/2009 | Zhao | |
| 2009/0326817 A1 | 12/2009 | Lin | |
| 2010/0238620 A1* | 9/2010 | Fish | G06F 1/1616 |
| | | | 361/679.09 |
| 2011/0102992 A1 | 5/2011 | Daley | |
| 2011/0122556 A1 | 5/2011 | Cheng et al. | |
| 2011/0157806 A1 | 6/2011 | Yamamoto | |
| 2011/0261509 A1 | 10/2011 | Xu | |
| 2011/0310029 A1* | 12/2011 | Uttermann | G06F 3/0416 |
| | | | 345/173 |
| 2012/0099264 A1 | 4/2012 | Degner et al. | |
| 2012/0106047 A1 | 5/2012 | Chu et al. | |
| 2013/0242495 A1 | 9/2013 | Bathiche | |
| 2014/0132550 A1 | 5/2014 | McCracken | |
| 2014/0169853 A1 | 6/2014 | Sharma et al. | |
| 2014/0198441 A1 | 7/2014 | Sharma et al. | |
| 2015/0098182 A1 | 4/2015 | Liu | |
| 2015/0146356 A1 | 5/2015 | Sharma et al. | |
| 2015/0192960 A1 | 7/2015 | Sharma | |
| 2015/0193009 A1 | 7/2015 | Sharma | |
| 2018/0046225 A1* | 2/2018 | Amarilio | G06F 1/1681 |

FOREIGN PATENT DOCUMENTS

| | | |
|---|---|---|
| CN | 1426548 | 6/2003 |
| CN | 1204502 | 6/2005 |
| CN | 1752891 A | 3/2006 |
| CN | 1821934 | 8/2006 |
| CN | 102037425 A | 4/2011 |
| JP | 3092874 | 9/2000 |
| JP | 2011-516974 | 5/2011 |
| KR | 10-2006-0004721 | 1/2006 |
| KR | 10-2006-0016424 | 2/2006 |
| KR | 10-2008-0015328 | 8/2009 |
| TW | 408255 | 10/2000 |
| TW | M355505 | 4/2009 |
| TW | M425307 | 3/2012 |
| TW | 201217944 | 5/2012 |
| TW | 201217944 A1 | 5/2012 |
| TW | M453891 | 5/2013 |
| WO | 2013/0112137 | 8/2013 |

OTHER PUBLICATIONS

PCT International Preliminary Report on Patentability in PCT International Patent Application No. PCT/US2012/022403 dated Jul. 29, 2014.
MSI's New Wind U160 Netbook Looks Familiar, announced Jan. 6, 2010 [online], [site visited Oct. 1, 2015]. Available from Internet, URL:<http://www.geek.com/chips/msis-new-wind-u160-netbook-looks-familiar-1044242/>.

* cited by examiner

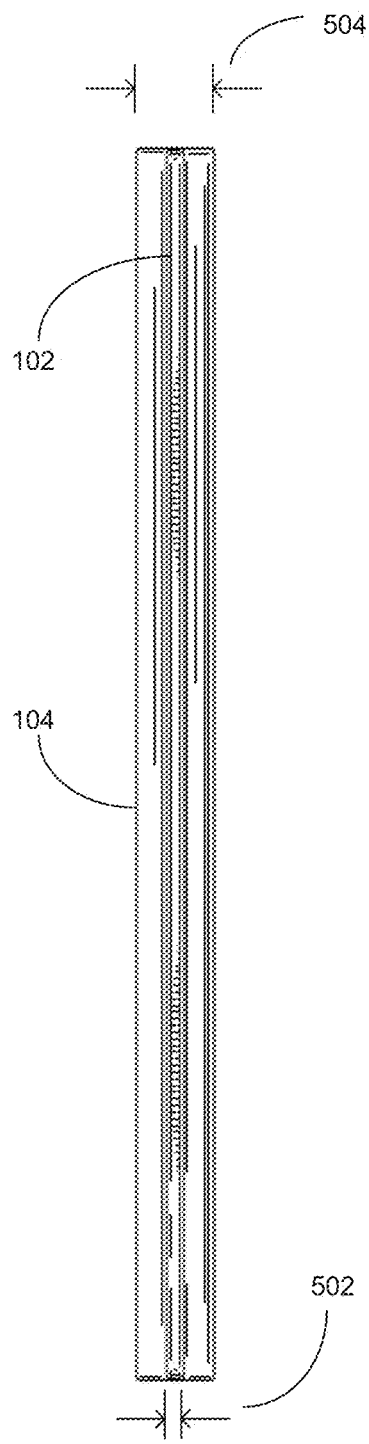
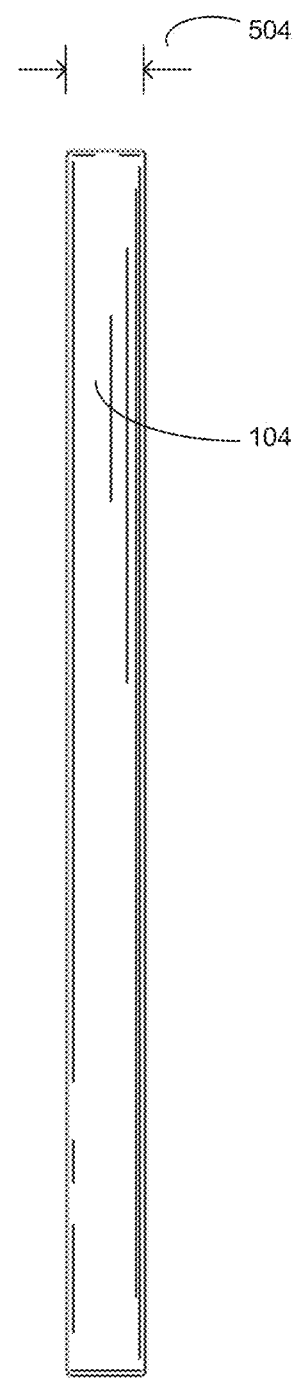
FIG. 5            FIG. 6

1150

1300

ARRANGING A TOUCH-SENSITIVE DISPLAY ON A FIRST SIDE OF AN ENCLOSURE OF A MOBILE COMPUTING DEVICE
1302

INTEGRATING A CYLINDRICAL PORTION ON AT LEAST ONE SIDE OF THE ENCLOSURE, THE CYLINDRICAL PORTION HAVING AN OUTER DIAMETER THAT IS LARGER THAN A THICKNESS OF THE ENCLOSURE AND A CAVITY DEFINED BY AN INNER DIAMETER
1304

ARRANGING ONE OR MORE ENERGY STORAGE MODULES IN THE CAVITY
1306

FIG. 13

MOBILE COMPUTING DEVICE, APPARATUS AND SYSTEM

RELATED APPLICATIONS

This Application is a continuation (and claims the benefit of priority under 35 U.S.C. § 120) of U.S. application Ser. No. 13/976,461, filed Jun. 26, 2013, entitled "MOBILE COMPUTING DEVICE, APPARATUS AND SYSTEM," Inventors Sameer Sharma et al., which is a National Stage filing under 35 U.S.C. § 371 of International Application No. PCT/US12/22403, filed on Jan. 24, 2012. The disclosures of the prior applications are considered part of (and are incorporated in their entireties by reference in) the disclosure of this application.

BACKGROUND

The performance and capabilities of modern computing systems have increased rapidly in recent years. Many computing system today include one or more processors, memory, wireless connectivity, displays and other components requiring electrical power. The number and type of capabilities and components in modern computing systems continues to increase, which often results in increased power consumption. Additionally, modern mobile computing systems continue to decrease in size, resulting in limited space for the different components necessary to implement the increased capabilities. Moreover, modern mobile computing systems are often used in a variety of different locations and usage scenarios which require ergonomically designed systems to ensure a pleasant user experience. As a result, it is desirable to improve mobile computing device designs. Consequently, there exists a substantial need for techniques to adapt mobile computing devices to accommodate components in an ergonomically efficient design.

BRIEF DESCRIPTION OF THE DRAWINGS

FIG. 5 illustrates one embodiment of a fifth system.
FIG. 6 illustrates one embodiment of a sixth diagram.
FIG. 13 illustrates one embodiment of a logic diagram.

DETAILED DESCRIPTION

Figure 1:
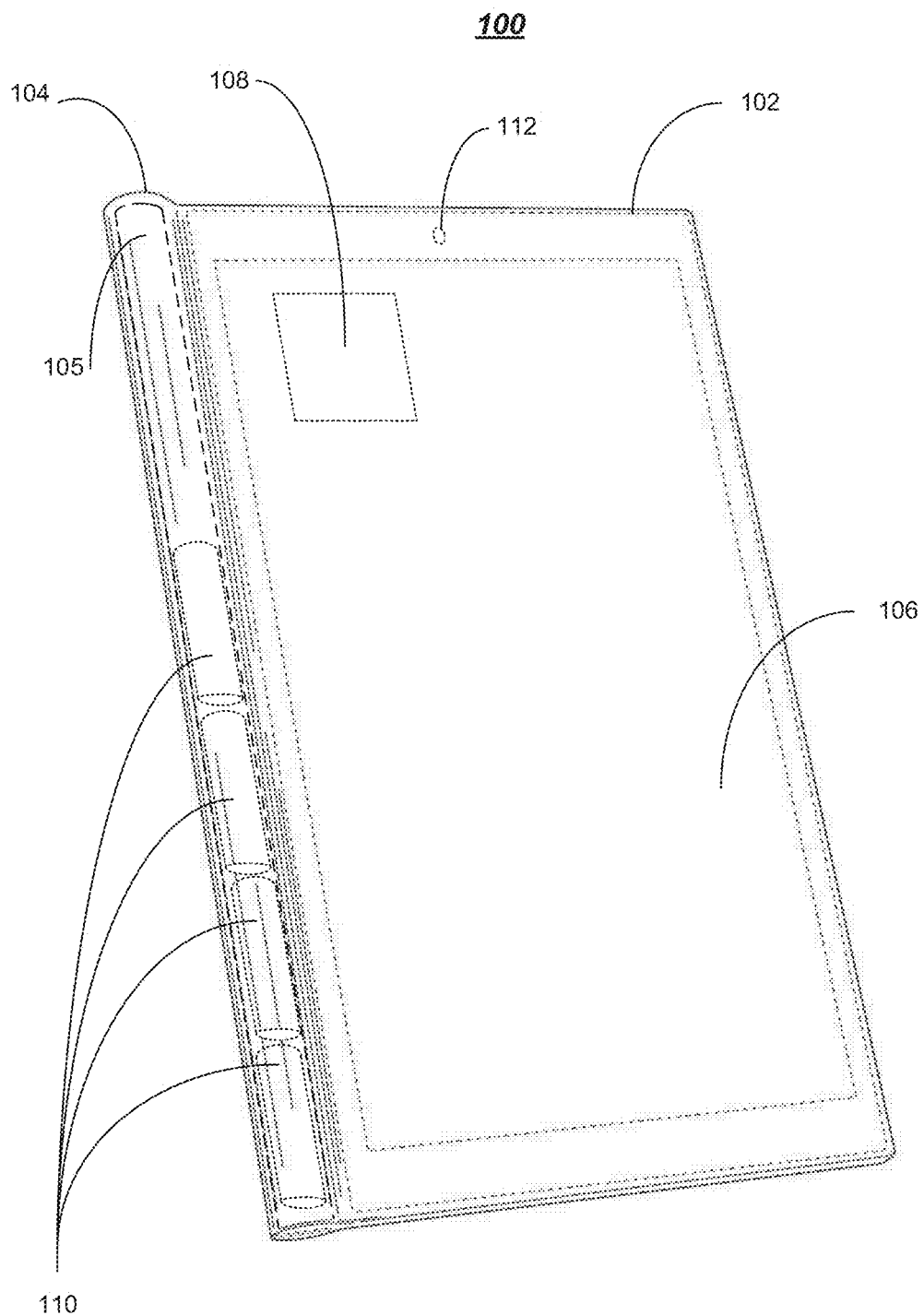
FIG. 1 illustrates one embodiment of a first system.

The embodiments are generally directed to a mobile computing device, apparatus and system. Various embodiments provide a system, apparatus and method that include an enclosure arranged to support a display and one or more processor circuits, the enclosure having an enlarged portion at one side of the enclosure arranged to allow a user to clutch the enclosure with one hand at the one side, the enlarged portion having a thickness that is larger than a thickness of another portion of the enclosure, and the enlarged portion defining a cavity arranged to support one or more energy storage modules. Various embodiments provide for a system, apparatus and method that include a mobile computing device and a removable input device. While referred to hereinafter as a cylindrical portion, it should be understood that the enlarged portion may comprise any suitable shape or orientation and still fall within the described embodiments. Other embodiments are described and claimed.

With the progression over time toward the use of computing devices of decreasing size and cost, the space available for components designed to provide power for the devices in a mobile computing device platform is becoming increasingly limited. Modern mobile computing devices, such as tablet computers, handheld computing devices and smartphones, require mobile power to provide a robust user experience. Current mobile computing devices include rechargeable batteries that are often an afterthought in the design and offer mobile power for a limited time based on the size, shape and capacity of the batteries. These batteries are typically square or rectangular and have large flat surfaces to allow the batteries to fit into areas of the computing device that do not force alterations to the size or shape of the device. These types of batteries, however, are generally not as efficient as cylindrical batteries. Therefore, some embodiments described herein are directed to techniques and designs to ergonomically accommodate cylindrical batteries in a mobile computing device. Other embodiments are described and claimed.

Modern computing devices, such as tablet computers, are held and manipulated by a user during use. For example, tablet computers are often held as a user would traditionally hold a book or magazine. Modern mobile computing devices fail to provide adequate methods to ensure the comfort of the user when the device is being held. In present mobile computing devices, the various thin and flat surfaces do not provide for a convenient holding position. In various embodiments, this may lead to a poor user experience. Therefore, some embodiments described herein are directed to techniques and designs to provide for an ergonomically efficient computing device design. Other embodiments are described and claimed.

The processing power and capabilities of modern mobile computing devices continues to increase, often resulting in increased functionality requirements. For example, in some embodiments it may be advantageous for a mobile computing device to couple with an input device to allow for data entry and device control. Currently available input device do not provide a good user experience and typing or performing other interactive actions on a display screen may be ergonomically uncomfortable. Moreover, Bluetooth keyboards and other currently available input devices may be cumbersome for a user to transport. Therefore, some embodiments described herein are directed to techniques to allow for a mobile computing device and one or more input devices to be removeably and interchangeably coupled. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 illustrates one embodiment of a mobile computing device or system 100. In various embodiments, the mobile computing device 100 may comprise multiple nodes, element or components. A node, element or component generally may comprise any physical or logical entity in the mobile computing device 100 and may be implemented as hardware, software, or any combination thereof, as desired for a given set of design parameters or performance constraints. Although FIG. 1 may show a limited number of nodes, elements and components by way of example, it can be appreciated that more or less nodes, elements or components may be employed for a given implementation.

In various embodiments, the mobile computing device 100 may comprise a tablet computer, handheld computer, personal digital assistant (PDA), cellular telephone, combination cellular telephone/PDA, smartphone, portable computer, pager, messaging device, media player, digital music player, or other suitable mobile computing device. Various embodiments described herein include reference to a tablet computer. The embodiments are not limited in this context.

Mobile computing device 100 may comprise a device operative to form part of a wired communications system, a wireless communications system, or a combination of both. For example, the mobile computing device 100 may comprise one or more nodes arranged to communicate information over one or more types of wired communication links. Examples of a wired communication link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile computing device 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The mobile computing device 100 may communicate information in accordance with one or more standards as promulgated by a standards organization. In one embodiment, for example, various devices comprising part of the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the mobile computing device 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; WGA (WiGig) progeny and variants; European Computer Manufacturers Association (ECMA) TG20 progeny and variants; and other wireless networking standards. The embodiments are not limited in this context.

The mobile computing device 100 may communicate, manage, or process information in accordance with one or more protocols. A protocol may comprise a set of predefined rules or instructions for managing communication among nodes. In various embodiments, for example, a communications system may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

In some embodiments, the mobile computing device 100 may comprise or be associated with a network and a plurality of other nodes. In various embodiments, the nodes may be implemented as various types of wireless or mobile computing devices. Examples of wireless devices may include, without limitation, an IEEE 802.15.3 piconet controller (PNC), a controller, an IEEE 802.11 PCP, a coordinator, a station, a subscriber station, a base station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, mobile computing device 100 may comprise or include one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, mobile computing device 100 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, a long term evolution (LTE) network and/or any other wireless communications network arranged to operate in accordance with the described embodiments.

While the embodiments are not limited in this context, mobile computing device 100 illustrates one possible computing device in some embodiments. In various embodiments, mobile computing device 100 may include enclosure 102, cylindrical portion 104, display 106, platform component(s) 108, energy storage modules 110 and sensor(s) 112. In some embodiments, the platform component(s) may include but are not limited to one or more processor circuits or memory. While a limited number and arrangement of components are shown in FIG. 1 for purposes of illustration, it should be understood that mobile computing device 100 may include any number or arrangement of components and still fall within the described embodiments. For example, mobile computing device 100 may additionally include, in some embodiments, memory containing instructions to be executed by one or more multi-core processors for example. The embodiments, however, are not limited to the elements or the configuration shown in this figure. Additional components for mobile computing device 100 are discussed in further detail below with reference to FIG. 14.

Platform component(s) 108 may comprise a processor circuit and/or memory in some embodiments. A processor may comprise any suitable electric device, semiconductor device, system on chip or other component in some embodiments. For example, a processor may comprise a multi-core processor in various embodiments. In some embodiments, a processor may include or comprise one or more radio modules or combination transmitter/receiver (e.g. transceiver) devices. In various embodiments, the transceiver device may comprise a device that has both a transmitter and a receiver that are combined and share common circuitry or a single housing. For example, in some embodiments, the transceiver may be operative to enable wireless communication capabilities for mobile computing device 100. Other embodiments are described and claimed.

Memory may comprise any suitable physical device operative to store data, programs, sequences of instructions or other information on a temporary or permanent basis for use in mobile computing device 100 in some embodiments. For example, memory may comprise volatile or non-volatile memory, RAM, ROM, virtual memory, solid state disk drive or a hard disc drive for example. The embodiments are not limited in this context.

In some embodiments, display 106 may comprise any suitable visual interface for displaying content to a user of the mobile computing device 100. In one embodiment, for example, the display 106 may be implemented by a liquid crystal display (LCD) or a touch-sensitive color LCD screen. The touch-sensitive LCD may be responsive to human touch or may be used with a stylus and/or a handwriting recognizer program in some embodiments. In other embodiments, display 106 may comprise a plasma display, light-emitting diode (LED) display or an organic light-emitting diode (OLED) display. Display 106 may comprise a digital touch-screen display arranged to occupy a substantial portion of a first side of a computing device 100 in some embodiments.

The one or more energy storage modules 110 may comprise any device suitable for providing electrical power to computing device 100 in various embodiments. For example, one or more energy storage modules 110 may comprise a battery or a plurality of batteries or other energy storage devices capable of storing and providing power to computing device 100. In some embodiments, the one or more energy storage modules 110 may comprise cylindrically shaped batteries. Other embodiments are described and claimed.

In various embodiments, mobile computing device 100 may include one or more sensors 112. The one or more sensors 112 may comprise one or more of a camera, accelerometer, proximity sensor, light sensor, compass or global positioning system (GPS) in some embodiments. The one or more sensors 112 of mobile computing device 100 may be arranged to provide various different functionality for the device 100, such as tilt sensing, rotating one or more user interface elements displayed on display 106 or any other suitable function as one skilled in the art would understand. While the one or more sensors 112 are shown in a particular location on mobile computing device 100 in FIG. 1, it should be understood that the embodiments are not limited in this respect. Other embodiments are described and claimed.

Mobile computing device 100 may include an enclosure 102 in some embodiments. Enclosure 102 may comprise an enclosure, housing, case or other device suitable to support, surround, protect or enclose one or more computing components for computing device 100. For example, enclosure 102 may comprise a rigid plastic or metal body that surrounds or supports one or more computing components 108 for computing device 100. In various embodiments, enclosure 102 may comprise the body or main portion of a tablet computer and may additionally include, support or comprise memory, one or more wireless transceivers operative to enable wireless communications for the computing device using one or more wireless communication protocols, one or more energy storage modules 110, display 106 or any other suitable component of computing device 100. Other embodiments are described and claimed.

In some embodiments, enclosure 102 may be designed to have a thin and sleek form factor in accordance with many modern computing system designs. In various embodiments enclosure 102 may additionally include or comprise cylindrical portion 104. Cylindrical portion 104 may comprise a portion of enclosure 102 that is formed as part of enclosure 102, integrated into enclosure 102 or attached to enclosure 102 in various embodiments. For example, cylindrical portion 104 may be seamlessly integrated along at least one edge or side of enclosure 102 as shown in FIG. 1. While shown on only one side in FIG. 1, it should be understood that cylindrical portion 104 could be formed or arranged on more than one side of enclosure 102 and still fall within the described embodiments. For example, in some embodiments an additional cylindrical portion 104 may be arranged on a second side of enclosure 102 opposite the side shown in FIG. 1 to include the cylindrical portion. Other embodiments are described and claimed.

Cylindrical portion 104 may have an outer diameter that is larger than a thickness of the enclosure 102 and a cavity 105 defined by an inner diameter that is smaller than the outer diameter. In some embodiments, the cavity 105 may be arranged to support the one or more energy storage modules 110. In various embodiments, the cavity 105 may be arranged to support substantially cylindrical batteries 110 that may be more energy efficient than flat batteries that are often used in modern computing devices. The cavity 105 may comprise a cylindrical opening that extends along the entire length of the cylindrical portion 104 in some embodiments which may allow for the placement of one or more energy storage modules 110 and/or any other suitable component (e.g. 108 and the like) in the cavity 105. In other embodiments, the cavity 105 may be arranged to extend along the interior of the cylindrical portion 104 for only a portion that is required to allow for the components (e.g. 110, 108 and the like) that will be arranged inside the cavity 105. Other embodiments are described and claimed.

Figure 2:
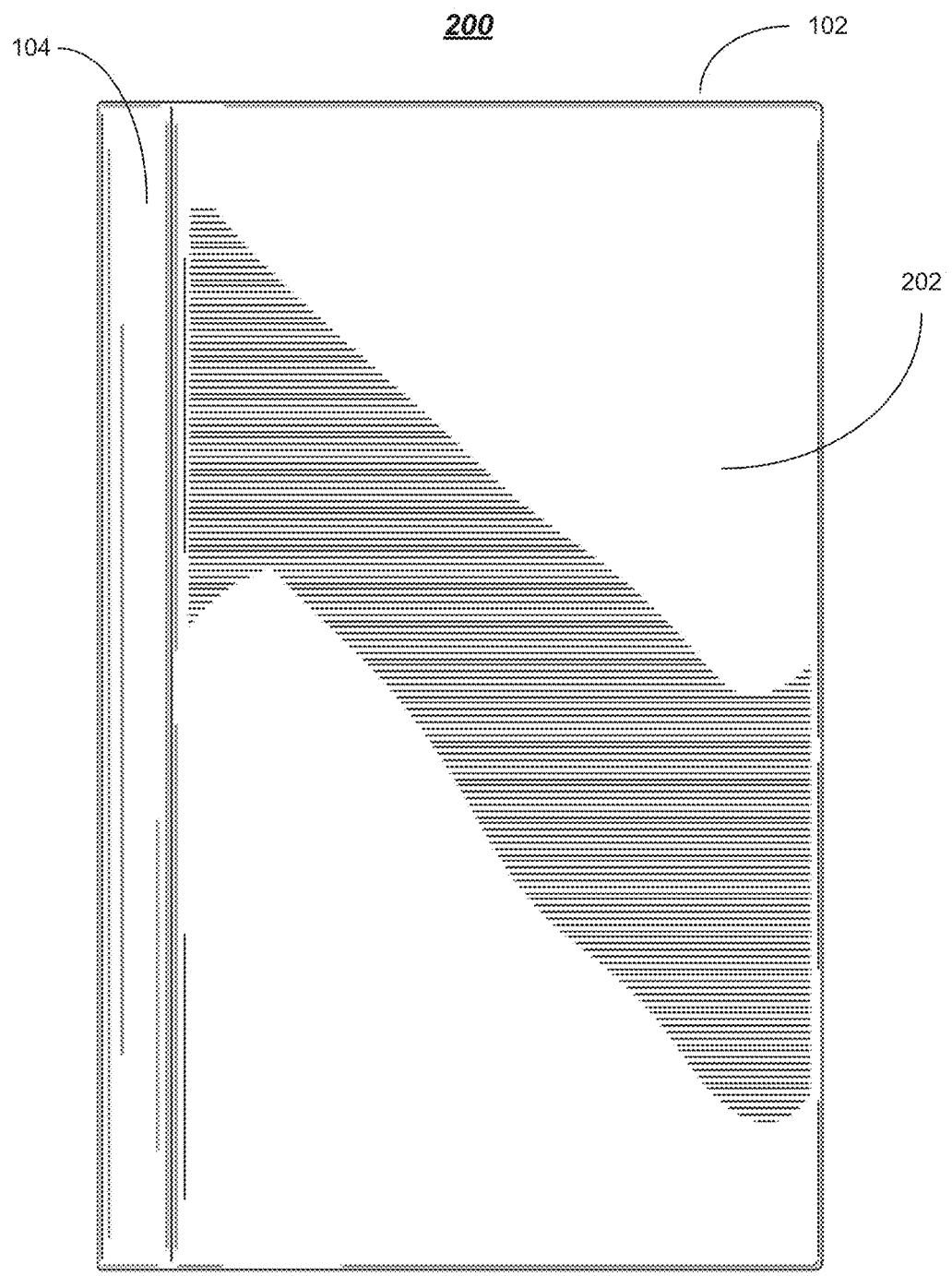
FIG. 2 illustrates one embodiment of a second system.

FIG. 2 illustrates a block diagram of one embodiment of a back side view 200 of a mobile computing device that may be the same or similar to mobile computing device 100 of FIG. 1 in various embodiments where like elements are similarly numbered. As shown in FIG. 2, the back side 202 of mobile computing device 100 may comprise or form part of the enclosure 102, protective casing or housing. While not shown in FIG. 2, it should be understood that back side 202 may include one or more user interface elements, a secondary display or any other suitable component and still fall within the described embodiments. For example, mobile computing device 100 may include a display on back side 202 and a display 106 on the opposite side of the computing device 100 as shown in FIG. 1 to implement a dual display computing device. Other embodiments are described and claimed.

Figure 3:
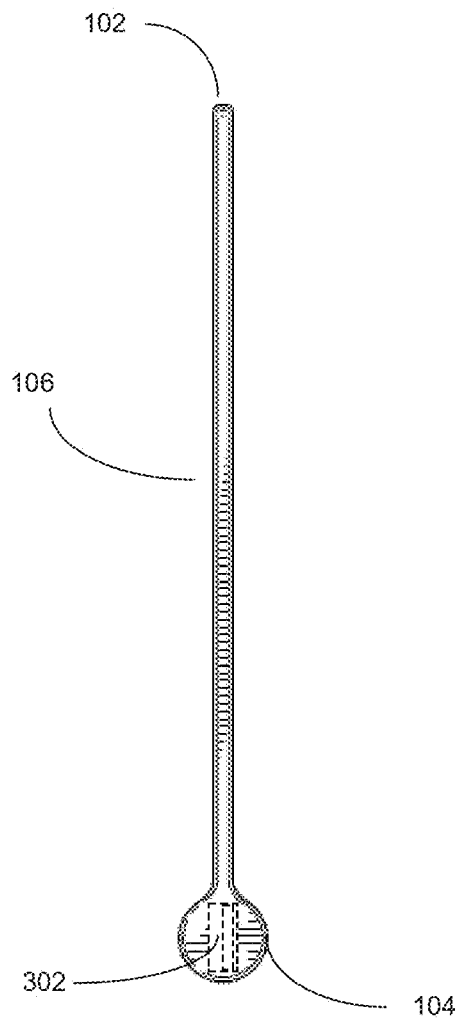
FIG. 3 illustrates one embodiment of a third system.
Figure 4:
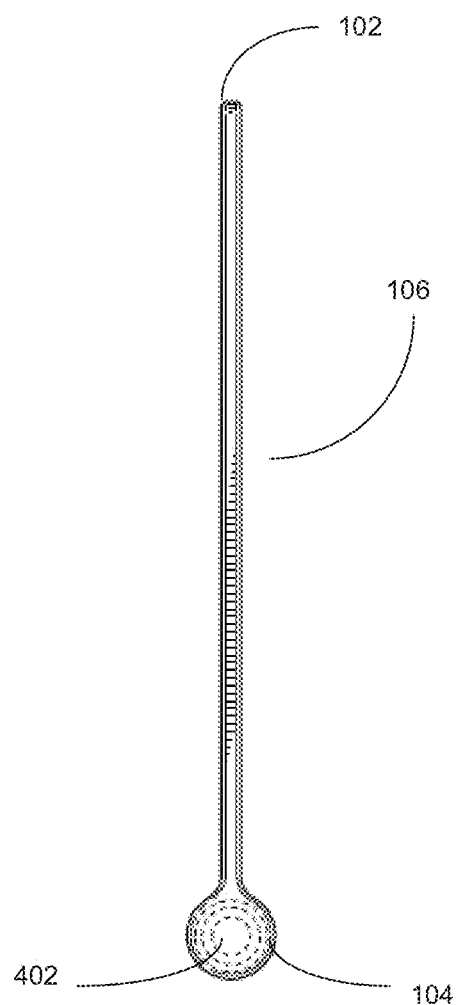
FIG. 4 illustrates one embodiment of a fourth system.

FIG. 3 illustrates a block diagram of one embodiment of a bottom end view 300 of a mobile computing device that may be the same or similar to mobile computing device 100 of FIG. 1 in various embodiments where like elements are similarly numbered. In some embodiments, FIG. 4 illustrates a block diagram of one embodiments of a top end view 400 of a mobile computing device that may be the same or similar to mobile computing device 100 of FIG. 1 in various embodiments where like elements are similarly numbered. As shown in FIGS. 3 and 4, the cylindrical portion 104 may be smoothly integrated into or formed as part of enclosure 102. While certain dimensions and proportions of the cylindrical portion 104 are shown with respect to a thickness of the enclosure 102, it should understand that the embodiments are not limited in this respect. It should also be understood that the cylindrical portion 104 need not be exactly cylindrical to fall within the described embodiments.

As shown in FIG. 3, the bottom end of the cylindrical portion 104 of mobile computing device 100 may comprise or include one or more input/output (I/O) ports arranged on an end of the cylindrical portion. In some embodiments, one or more I/O ports may be communicatively coupled to the one or more processor circuits 108 to allow for communication with one or more peripheral devices coupled to the one or more I/O ports. In various embodiments, the one or more I/O ports may comprise one or more of an Ethernet interface, a Universal Serial Bus (USB) interface, a Thunderbolt® interface, a DisplayPort interface, a MiniDisplayPort (mDP) interface and/or the like. Other embodiments are described and claimed.

As shown in FIG. 4, the top end of the cylindrical portion 104 of mobile computing device 100 may comprise or include one or more one or more integrated input devices such as one or more buttons or switches arranged on an end of the cylindrical portion and communicatively coupled to the one or more processor circuits 108. For example, in some embodiments the computing device 100 may include only one button or switch that is discretely located on an end of the cylindrical portion 104 as shown in FIG. 4. In various embodiments, the single button or switch may be operative to turn the computing device 100 on and off and may also control various other functionality, including operating as a home screen button. While not shown in detail in FIGS. 3 and 4, some embodiments may include one or more power adapter ports on an end of the cylindrical portion 104 as discussed in more detail with reference to FIG. 12. Other embodiments are described and claimed.

In various embodiments, the one or more energy storage modules 110 may be removable. For example, one or more ends of the cylindrical portion 104 may include a screw cap or other mechanism that may allow for the exchange or replacement of the one or more energy storage modules 110. In this manner, additional or spare batteries may be carried by a travel who desires to use the computing device 100 for an extended period of time that may exceed the life of just one set of the one or more energy storage modules 110. The embodiments are not limited in this respect.

FIG. 5 illustrates a block diagram of one embodiment of a right side view 500 of a mobile computing device that may be the same or similar to mobile computing device 100 of FIG. 1 in various embodiments where like elements are similarly numbered. In some embodiments, FIG. 6 illustrates a block diagram of one embodiments of a left side view 600 of a mobile computing device that may be the same or similar to mobile computing device 100 of FIG. 1 in various embodiments where like elements are similarly numbered. As shown in FIGS. 5 and 6, the cylindrical portion 104 may have a diameter or dimension 504 that is larger than a thickness or width 502 of enclosure 102. While certain dimensions and proportions of the cylindrical portion 104 are shown with respect to a thickness of the enclosure 102, it should understand that the embodiments are not limited in this respect. It should also be understood that the cylindrical portion 104 need not be exactly cylindrical to fall within the described embodiments.

As similarly shown in FIGS. 5 and 6, the cylindrical portion 104 may have a dimension or diameter 504 that is larger than a thickness or dimension 502 of the enclosure 102. In some embodiments, this arrangement may allow for components such as one or more energy storage modules 110 to be removed from behind display 106 and relocated into the cavity 105 of the cylindrical portion 104. This unique design may allow for a decrease in the thickness 502 of the main body of the enclosure 102 as the batteries and/or other components are been extracted into the cylindrical portion 104. In various embodiments, this may result in an improved computing device 100 design. For example, from a user experience perspective, this design may provide the user with something to hold onto (e.g. the cylindrical portion 104) when they are using the device. Additionally, from a technology perspective, cylindrical batteries 110 that may be incorporated into the cavity 105 of the cylindrical portion 104 are one of the most efficient ways to store charge currently available, which may result in improved battery life, performance and other advances for the computing devices 100 described herein.

While the computing device 100 described above is fully functionally as, for example, a tablet computing device, one or more removable input devices may assist in capturing the full potential of the device and allow for a more robust user experience. For example, the addition of a keyboard and/or trackpad or other pointing device may allow for use of the computing device 100 as a more traditional personal computer or laptop computer.

Figure 7:
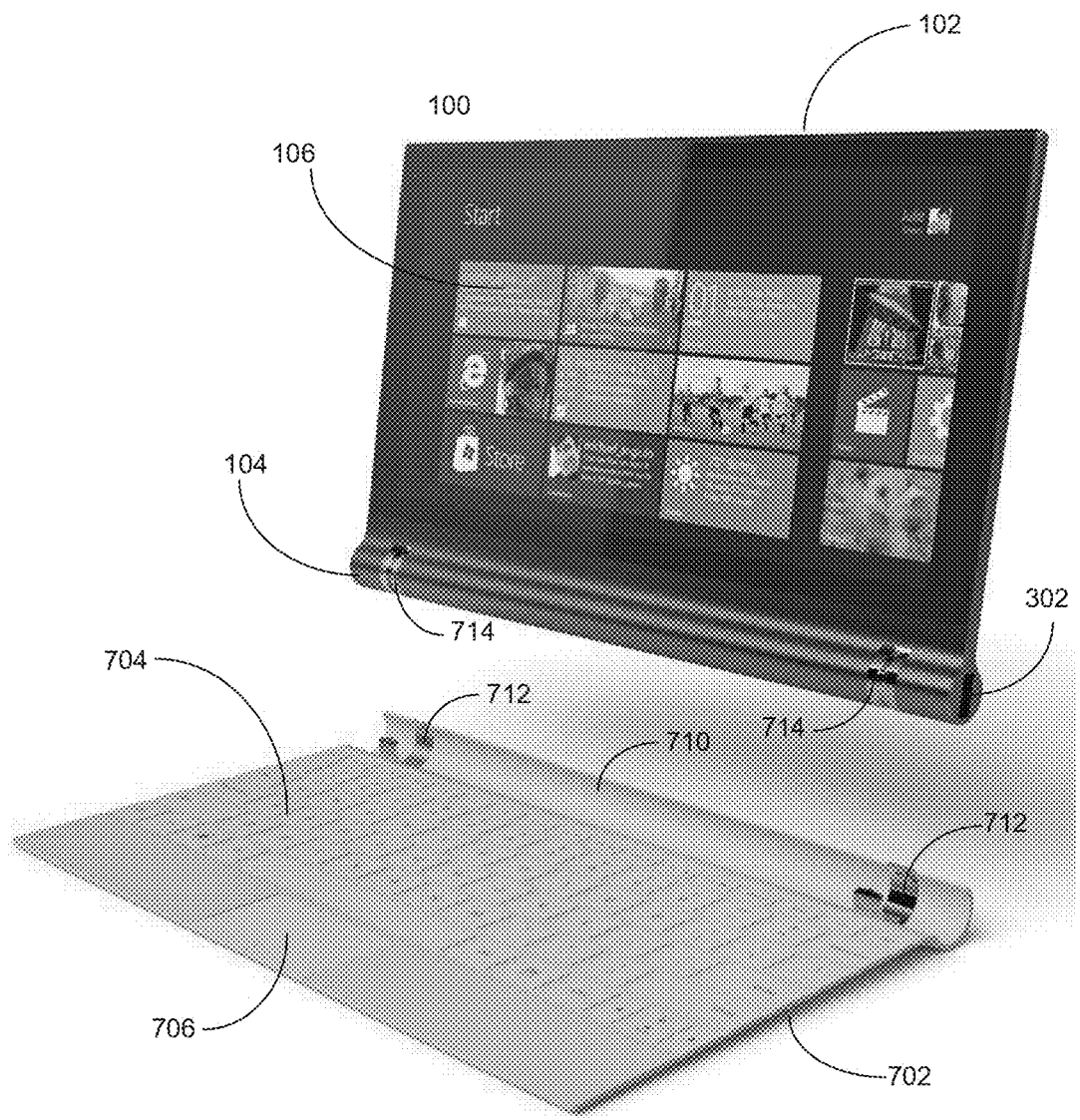
FIG. 7 illustrates one embodiment of a seventh system.

FIG. 7 illustrates one embodiment of a system 700. System 700 may comprise a combination or hybrid computing device in some embodiments. For example, the hybrid computing device 700 may comprise or include a combination of computing device 100 that may be the same or similar to computing device 100 of FIG. 1 and an input device 702 that may be removeably coupled with computing device 100, where like elements are similarly numbered throughout. Other embodiments are described and claimed.

As shown in FIG. 7, the hybrid computing device 700 may include but is not limited to mobile computing device 100 that includes an enclosure 102 including a cylindrical portion 104 integrated on at least one side of the enclosure 102. In various embodiments, the cylindrical portion 104 may be arranged to have an outer diameter that is larger than a thickness of the enclosure and a cavity defined by an inner diameter as described with reference to FIGS. 1-6. In some embodiments, one or more energy storage modules may be arranged inside the cavity. For example, one or more cylindrical batteries may be arranged inside the cavity.

In various embodiments, an input device 702 may be removeably coupled to the cylindrical portion 104. For example, the input device 702 may comprise a removable or detachable keyboard 704 and/or trackpad or pointing device 706. The keyboard may comprise a QWERTY keyboard for example. Unlike many "after-thought" tablet computing solutions currently available with an accessory keyboard, the hybrid computing device 700 comprises a fully integrated design solution that provides the touch-screen interaction and capabilities of a tablet computing device and the touch-typing experience of a clamshell, laptop or netbook computer in a compact, practical and aesthetically pleasing platform.

Like a conventional clamshell, laptop or netbook computing device, the hybrid computing device 700 may comprise or include a main portion 102/104, which contains a main logic board, barrel batteries and other components, and a separate input device section 702. In various embodiments, the unique socket mechanism comprising the combination of the cylindrical portion 104 and a cylindrical recess 710 allows the computing device 100 to be attached to the input device 702 at least two different ways. For example, the computing device 100 could be attached such that the display 106 is facing inward or outward with respect to the keyboard 704. In some embodiments, this unique mechanism may allow for the hybrid computing device 700 to be used in multiple modes, such as a laptop mode, tablet mode, movie mode, closed mode or different clamshell modes. Other embodiments are described and claimed.

In various embodiments, the input device 702 may include a recess portion 710 arranged to receive the enlarged or cylindrical portion 104 of the computing device 100. For example, the recess portion 710 may comprise a cylindrical channel that is arranged to have a shape and size that substantially matches that of the cylindrical portion 104. In this manner, the cylindrical portion 104 may fit snuggly within the cylindrical recess portion 710 when the computing device 100 and input device 702 are coupled together. In some embodiments, the fit between the cylindrical portion 104 and the cylindrical recess portion 710 may be tight and may be arranged to apply a mechanical or friction force to the cylindrical portion 104 to partially restrict movement of the computing device 100 with respect to the input device 702 when the two are coupled together.

In some embodiments, one or more electrical and/or mechanical connectors or other coupling mechanisms 712/714 may be included on one or more of the cylindrical portion 104 and the cylindrical recess portion 710. For example, one or more magnetic portions, pulley portions, gear portions or connector portions may be arranged to align and couple the computing device 100 and the input device 702. In various embodiments, the connectors or coupling mechanisms 712/714 may help to secure the computing device 100 and the input device 702 together to form the hybrid computing device 700. The one or more connectors or coupling mechanisms 712/714 may also or alternatively comprise electrical connectors arranged to communicatively couple the computing device 100 and the input device 702 in some embodiments. For example, the one or more connectors or coupling mechanisms 712/714 may provide an electrical or other communication connection between the keyboard 704 and/or trackpad 706 of the input device and the processor 108 or other suitable component of computing device 100.

In various embodiments, the one or more connectors 714 on the cylindrical portion 104 may be arranged to align with the one or more connectors 712 disposed or arranged in the cylindrical recess portion 710 of the input device 702 when the input device 702 is coupled to the computing device 100. For example, the one or more connectors 714 on the cylindrical portion 104 may be arranged to share a magnetic attraction with the one or more connectors 712 disposed or arranged in the cylindrical recess portion 710. In this manner, a user who is inserting cylindrical portion 104 of the computing device 100 into the cylindrical recess 710 of the input device 702 will be guided and the coupling will occur smoothly and in the correct position to ensure a positive user experience.

The one or more connectors 712/714 may comprise mechanical connectors and may be arranged to provide mechanical resistance between the cylindrical portion 104 and the cylindrical recess portion 710 to maintain a position of the computing device 100 with respect to the input device 702 in some embodiments. For example, the one or more connectors 712/714 may comprise magnetic connectors, pulley connectors, gear connectors, hinge connectors or male-female connectors or the like the provide mechanical resistance to maintain the computing device 100 in a desired position but still able to be moved and adjusted by a user with minimal effort. Other embodiments are described and claimed.

While described herein as including an electrical connection to enable communication between the computing device 100 and the input device 702, it should be understood that any suitable communication technology could be used and still fall within the described embodiments. For example, the computing device 100 and the input device 702 may be equipped with Bluetooth or another suitable wireless technology to allow wireless communication between the devices in some embodiments. Other embodiments are described and claimed.

Figure 8:
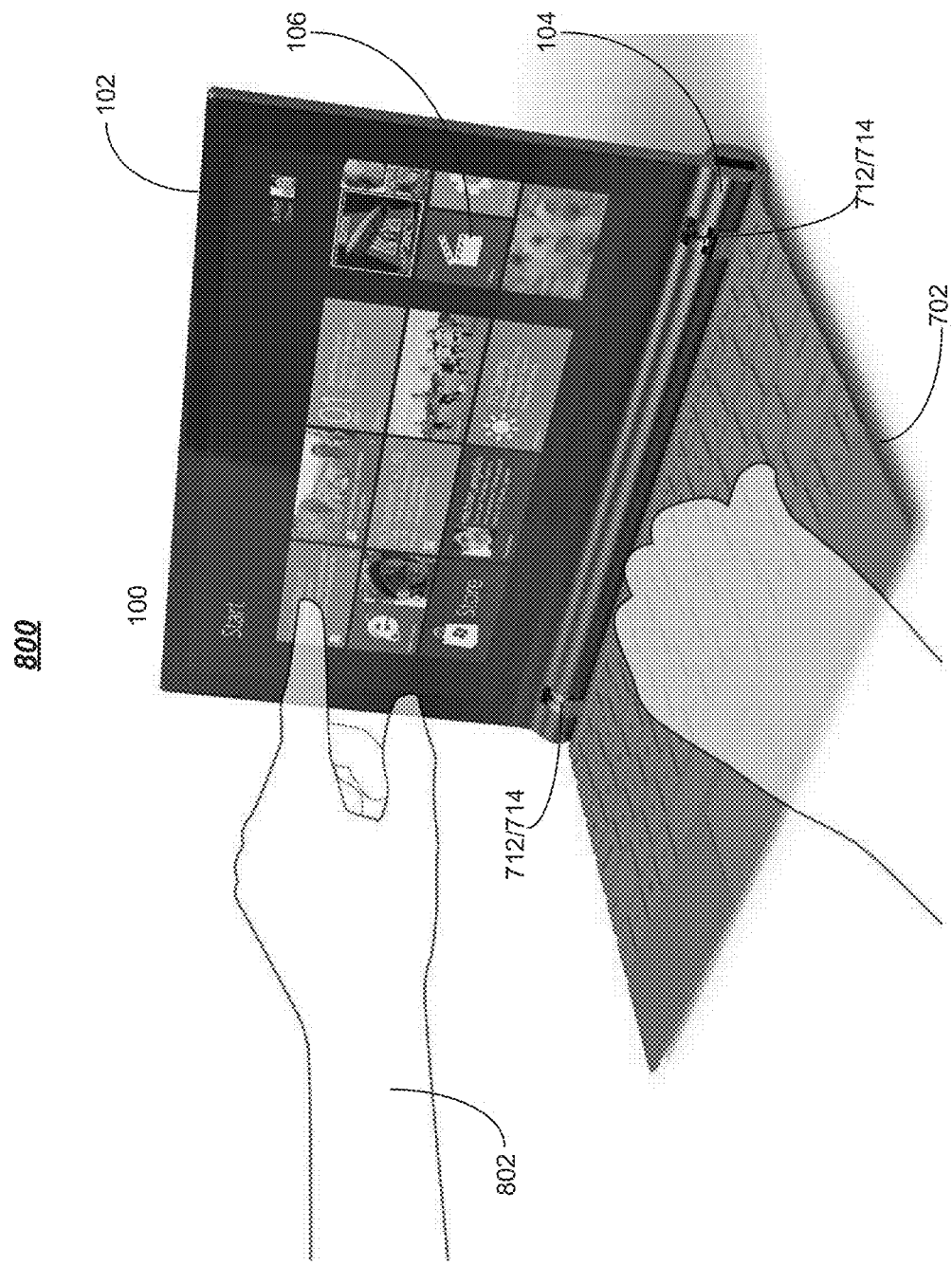
FIG. 8 illustrates one embodiment of an eighth system.

FIG. 8 illustrates one embodiment of a system 800. The system 800 may comprise a hybrid computing device 800 that may be the same or similar to hybrid computing device 700 of FIG. 7 where like elements are similarly numbered. In some embodiments, hybrid computing device 800 may illustrate an embodiment where computing device 100 and input device 702 have been coupled together in a clamshell or laptop mode or configuration. For example, as shown in FIG. 8 the input device 702 may be arranged to support the computing device 100 such that a display 106 of the computing device 100 and a plurality of keys, keyboard 704 or trackpad 706 of the input device 702 are accessible and operable in a clamshell or laptop configuration.

In various embodiments, with the display 106 in the configuration shown in FIG. 8, the hybrid computing device 800 may be operable as a clamshell or laptop computer, enabling a user 802 to interact with the touch-sensitive display 106 and also to control the device 100 or enter data using the keyboard 704 or trackpad 706 of the input device 702. In some embodiments, the keyboard 704 may comprise an 18.5 mm pitch full size keyboard that provides a traditional touch-typing experience. The embodiments are not limited in this respect.

The one or more connectors 712/714 are shown in FIG. 8 in their coupled position. This coupling may provide mechanical resistance to secure the computing device 100 with respect to the input device 702 and may also communicatively couple the computing device 100 or one or more components of the computing device 100 and the input device 702. Despite the applied mechanical resistance, the position of the computing device 100 may be adjustable as shown and described in more detail with respect to FIGS. 9A and 9B.

In various embodiments, the location of the one or more energy storage modules 110 in the cavity 105 of the cylindrical portion 104 of the computing device 100 may assist in maintaining the computing device 100 in a desired clamshell or laptop mode configuration as shown in FIG. 8. For example, moving the one or more energy storage modules 110 from a position behind the display 106 where they are typically found in a traditional computing device to a position in the cylindrical portion 104 as described herein may improve the balance or weighting of the device in the hybrid configuration as shown. Other embodiments are described and claimed.

Figure 9:
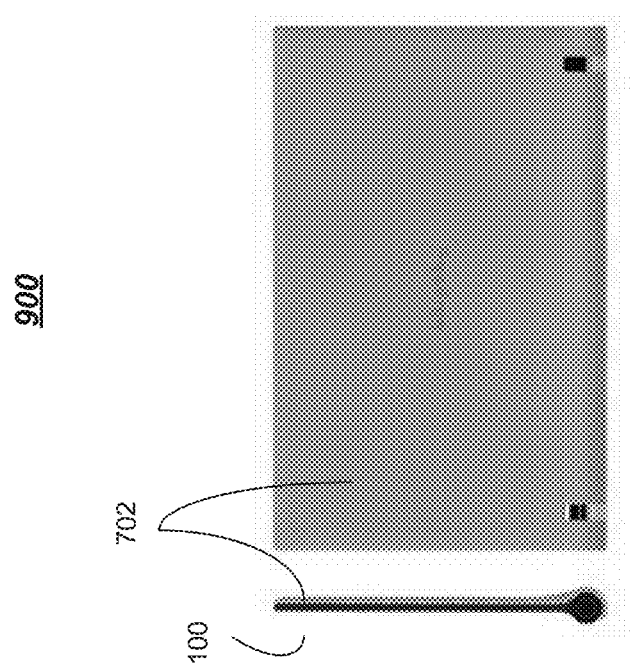
FIG. 9 illustrates one embodiment of a ninth system.

FIG. 9 illustrates an embodiment of a system 900. The systems 900 may comprise a hybrid computing device 900 that may be the same or similar to hybrid computing device 700 of FIG. 7 and/or hybrid computing device 800 of FIG. 8 where like elements are similarly numbered. In various embodiments, the computing device 100 may be arranged to freely rotate around a pivot point defined at the center axis of the cylindrical portion 104 and the cylindrical recess portion 710. In this manner, the angle of the computing device 100 with respect to the input device 702 can be freely adjusted.

In some embodiments, the input device 702 may be sized and arranged to align with and substantially conceal a display 106 or substantially an entire side of the enclosure 102 of the computing device 100 in a closed configuration as shown in FIG. 9. In these embodiments the input device 702 may be arranged to be inoperable and the input device 702 may be arranged to protect the display. The closed configuration shown in FIG. 9 may also provide for a compact and secure device design making the device easy to transport.

Figure 10:
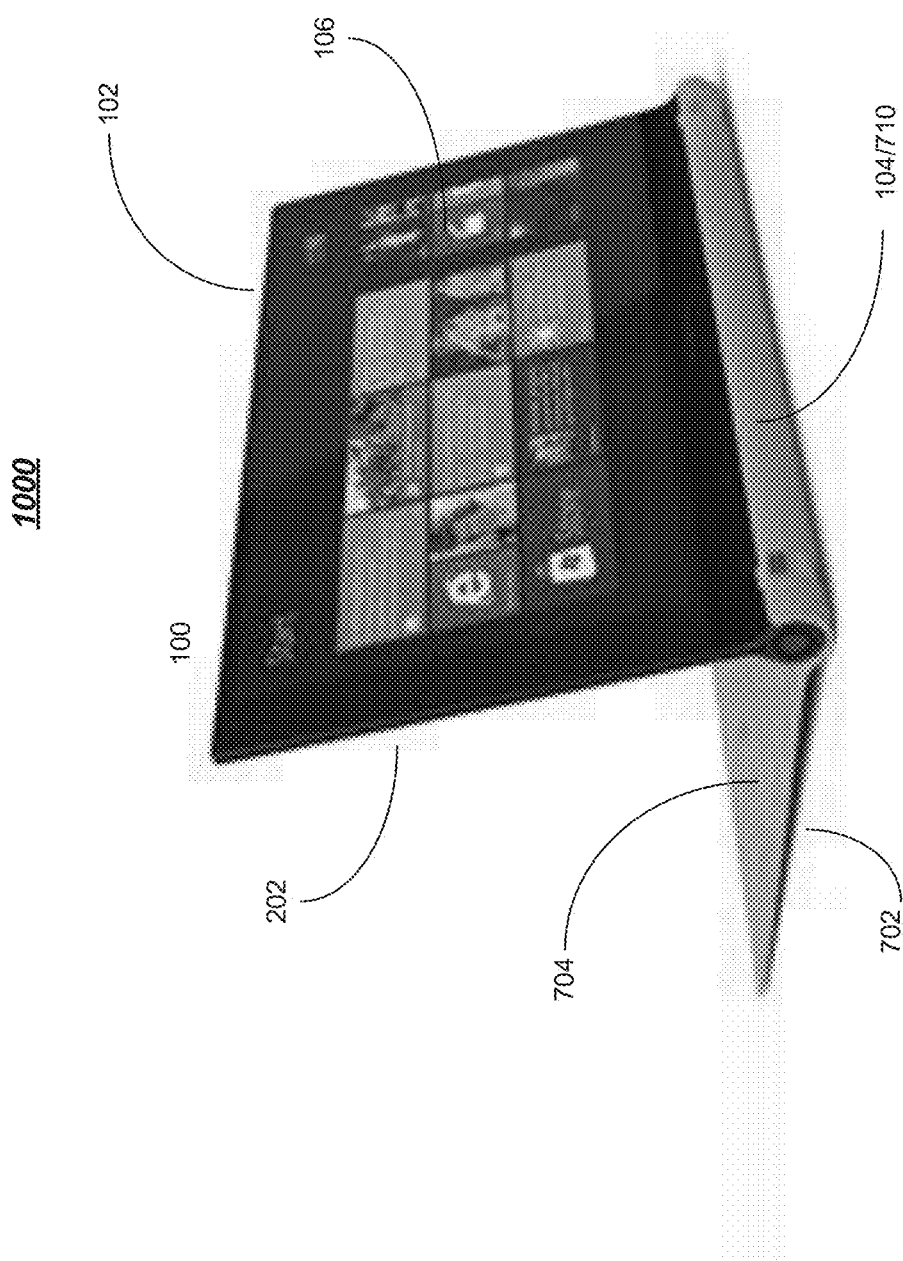
FIG. 10 illustrates one embodiment of an tenth system.

In various embodiments, because the computing device 100 is removable from the input device 702, other configurations may be possible as well which result in a highly configurable and dynamic device design. For example, FIG. 10 illustrates one embodiment of a system 1000. The system 1000 may comprise a hybrid computing device 1000 that may be the same or similar to hybrid computing device 700 of FIG. 7, hybrid computing device 800 of FIG. 8, hybrid computing device 900 of FIG. 9A and/or hybrid computing device 950 of FIG. 9B where like elements are similarly numbered. As shown in FIG. 10, the input device 702 may be arranged to support the computing device 100 such that a display 106 of the computing device 100 is accessible and operable and a plurality of keys, keyboard 704 and/or trackpad 706 of the input device 702 are not accessible and the input device is inoperable in a movie-mode configuration. As shown in FIG. 10, the movie-mode or second clamshell configuration may allow for the input device 702 to act as a stand for the computing device 100. Other embodiments are described and claimed.

Figure 11A:
FIG. 11A illustrates one embodiment of a eleventh system.

FIG. 11A illustrates one embodiment of a system 1100. The system 1100 may comprise a hybrid computing device 1100 that may be the same or similar to hybrid computing device 1000 of FIG. 10 where like elements are similarly numbered. As shown in FIG. 11A, from the movie-mode configuration, the computing device 100 may be further rotated such that the input device 702 is arranged to substantially align with a back side 202 of the computing device 100 to substantially conceal a plurality of keys, keyboard 704 and/or trackpad 706 of the input device 702 in a tablet configuration. In various embodiments, the input device 702 may be arranged to be inoperable in the tablet configuration. In the configuration shown in FIG. 11A, with the display 106 flipped upside-down to face outward, the computing device may be operable to function as a tablet computing device with the barrel-shaped socket mechanism or cylindrical portion 104 severing as an ideal grip or holding location. In this mode, the keyboard 704 is stowed behind the display 106 and the input device may provide additional protection to the back side 202 of the computing device 100.

Figure 11B:
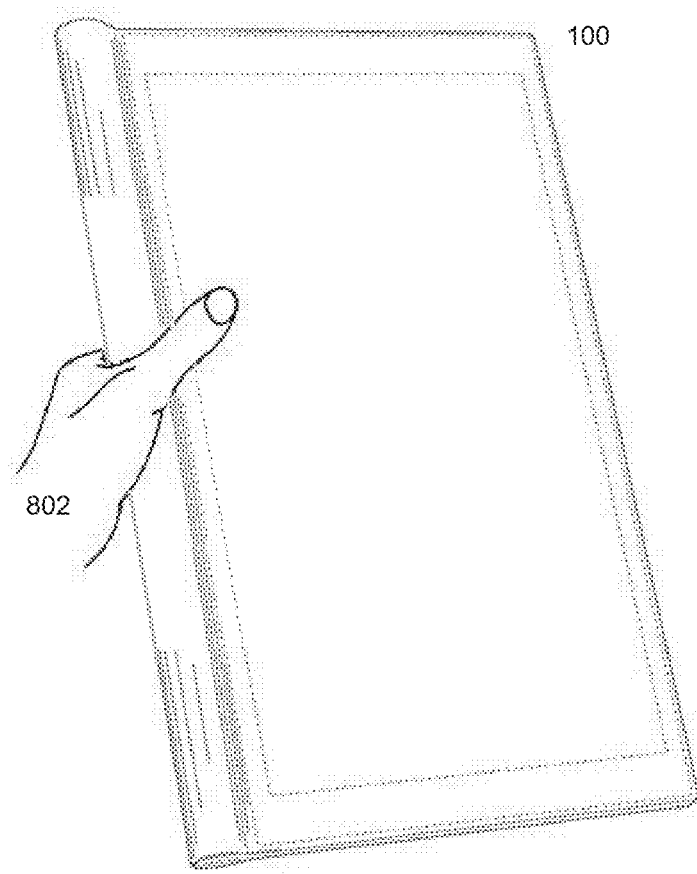
FIG. 11B illustrates one embodiment of a twelfth system.

FIG. 11B illustrates one embodiment of a system 1150. The system 1150 may comprise a hybrid computing device 1150 that may be the same or similar to hybrid computing device 1100 of FIG. 11A where like elements are similarly numbered. As shown in FIG. 11B, a user 802 may be able to comfortably hold, clutch or grasp the device 100 in an idea position by holding, clutching or grasping the cylindrical portion of the device 100. In this manner, a user may be able to comfortably hold onto the device while performing any number of tasks, including reading for example. While one holding position is shown in FIG. 11B, it should be understood that any holding position or other configuration could be used and still fall within the described embodiments.

As described elsewhere herein, when the computing device 100 is detached from the input device 702, the computing device 100 is operable to function as a simple light-weight tablet computing device by itself. The addition of the input device 702, however, may improve the usability of the hybrid computing device. In various embodiments, the unique detachability of the hybrid computing device may allow for different types of input devices, different keyboards or other suitable devices to be coupled together. For example, an ultra-thin keyboard with dome switch based keys may be available for portability or a conventional scissor mechanism based keyboard may be available for the best typing experience. The embodiments are not limited in this respect.

Figure 12:
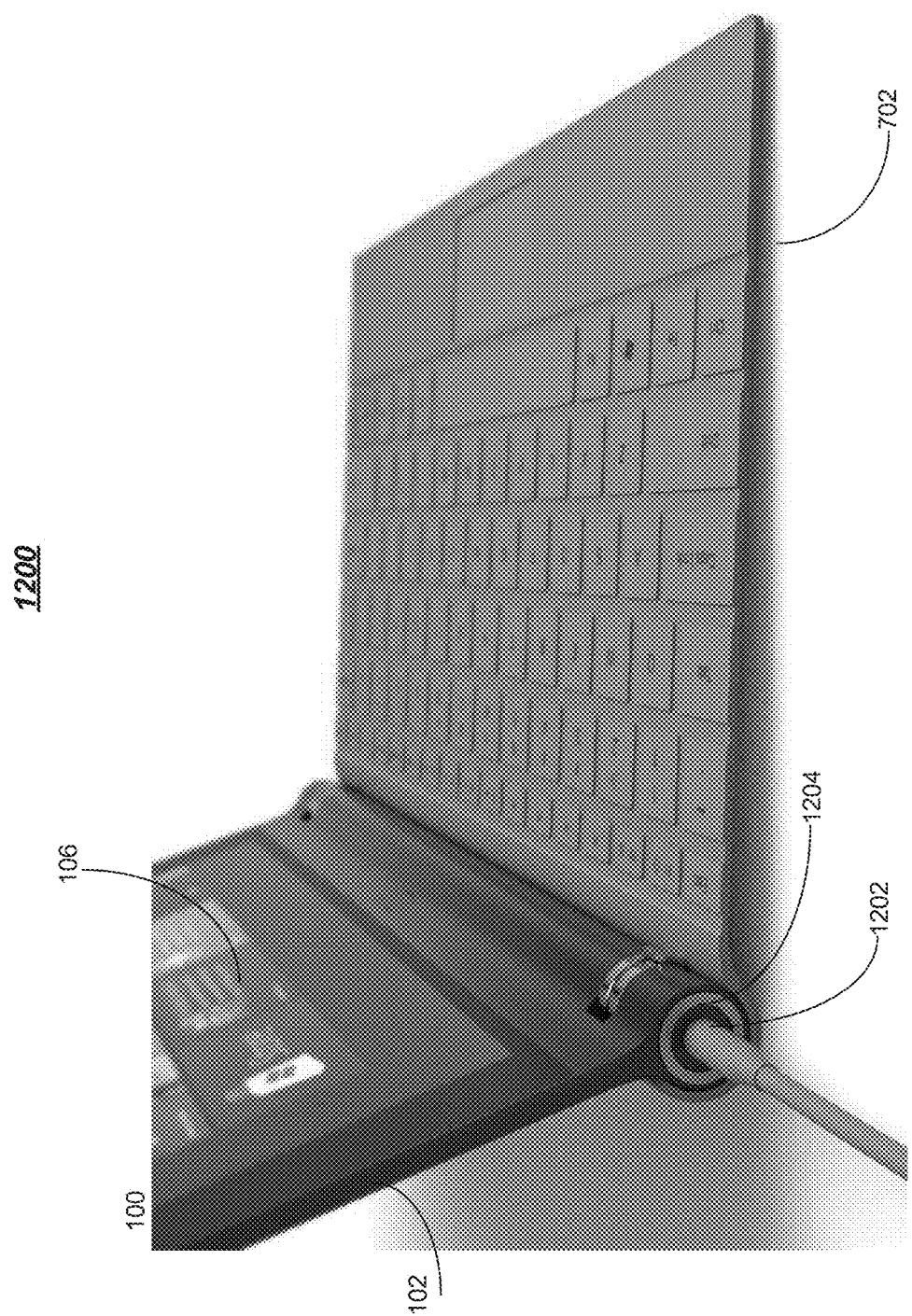
FIG. 12 illustrates one embodiment of a thirteenth system.

FIG. 12 illustrates one embodiment of a system 1200. The system 1200 may comprise a hybrid computing device 1200 that may be the same or similar to the hybrid computing devices described elsewhere herein where like elements are similarly numbered. As shown in FIG. 12, the hybrid computing device may include a power connector 1202 on at least one end of the cylindrical portion 104. The power connector 1202 may comprise any suitable power delivery technology or port and may allow for the charging of the one or more energy storage modules 110 arranged inside the cavity 105 of the cylindrical portion 104. In some embodiments, the end of the cylindrical portion 104 may additionally or alternatively include one or more integrated input devices 1204, such as one or more buttons or switches to control one or more operations of the computing device 100, such as but not limited to turning the device 100 on or off. Other embodiments are described and claimed.

Included herein are one or more flow charts representative of exemplary methodologies for constructing or assembly one or more aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 13 illustrates one embodiment of a logic flow 1300. The logic flow 1300 may be representative of a series of steps or processes necessary to build or implement a hybrid computing device as described elsewhere herein. A touch-sensitive display may be arranged on a first side of an enclosure of a mobile computing device at 1302 in some embodiments. For example, display 106 may be arranged on a first side of enclosure 102. At 1304, a cylindrical portion may be arranged on at least one side of the enclosure. For example, a cylindrical portion 104 having an outer diameter that is larger than a thickness of the enclosure 102 and a cavity 105 defined by an inner diameter may be arranged on at least one side of enclosure 102. In various embodiments, one or more energy storage modules may be arranged in the cavity at 1306. For example, cylindrical batteries 110 may be arranged inside cavity 105 of cylindrical portion 104 in some embodiments.

In various embodiments, an input/output (I/O) port may be arranged on a first end of the cylindrical portion and one or more integrated input devices may be arranged on a second end of the cylindrical portion opposite the first end. For example, a USB port 302 may be arranged on a first end and a power button or power connector port 402 may be arranged on an opposite end. In some embodiments, one or more processor circuits or other platform components may be arranged in the cavity. For example, processor 108 may be arranged inside cavity 105. Other embodiments are described and claimed.

Figure 14:
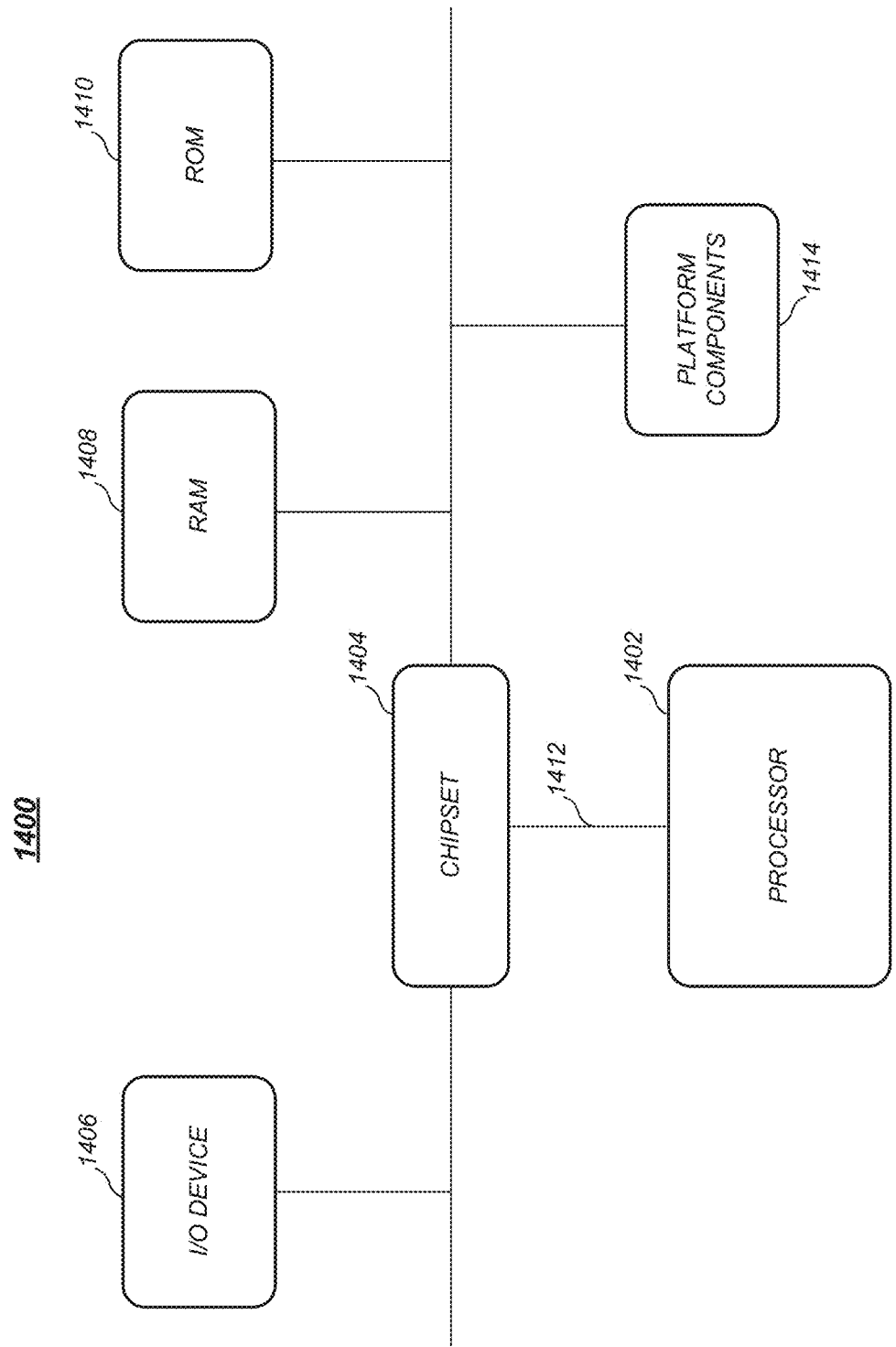
FIG. 14 illustrates one embodiment of a fourteenth system.

FIG. 14 is a diagram of an exemplary system embodiment. In particular, FIG. 14 is a diagram showing a system 1400, which may include various elements. For instance, FIG. 14 shows that system 1400 may include a processor 1402, a chipset 1404, an input/output (I/O) device 1406, a random access memory (RAM) (such as dynamic RAM (DRAM)) 1408, and a read only memory (ROM) 1410, and various platform components 1414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 14, I/O device 1406, RAM 1408, and ROM 1410 are coupled to processor 1402 by way of chipset 1404. Chipset 1404 may be coupled to processor 1402 by a bus 1412. Accordingly, bus 1412 may include multiple lines.

Processor 1402 may be a central processing unit comprising one or more processor cores and may include any number of processors having any number of processor cores. The processor 1402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 1400 may include various interface circuits, such as an Ethernet interface and/or a Universal Serial Bus (USB) interface, and/or the like. In some exemplary embodiments, the I/O device 1406 may comprise one or more input devices connected to interface circuits for entering data and commands into the system 1400. For example, the input devices may include a keyboard (physical or virtual/soft), mouse, touch screen, track pad, track ball, isopoint, a voice recognition system, and/or the like. Similarly, the I/O device 1406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 1400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design, performance or cost constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may comprise a non-transitory medium in some embodiments and may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device which is configurable to operate asunder and integrated, the computing device comprising:
   a casing including:
      a flat portion to house a display; and,
      a barrel portion securely affixed directly to one side of the flat portion, wherein the barrel portion is at least partially cylindrical, and wherein the barrel portion is wider than a thickness of the flat portion; and
   a base, the base including one or more electronic components, wherein the base is configured to removably couple, magnetically, to the casing;
   wherein, the barrel portion at least houses one or more batteries capable of supplying power to the display.

2. The computing device of claim 1, wherein the flat portion protrudes along an entire length of the barrel portion.

3. The computing device of claim 1, wherein the barrel portion comprises a grip for the computing device casing.

4. The computing device of claim 1, wherein the display is approximately 10 inches diagonally.

5. The computing device of claim 1, wherein the barrel portion is at least partially cylindrical, and wherein the flat portion is to protrude along a surface of the barrel portion at a location parallel to an axis of the barrel portion.

6. The computing device of claim 5, wherein the axis is approximately located in a plane extending through the middle of the thickness of the flat portion.

7. The computing device of claim 1, wherein the base is capable of mechanically coupling to the barrel portion.

8. The computing device of claim 7, wherein the base is capable of mechanically decoupling from the barrel portion.

9. The computing device of claim 7, wherein the base includes a scoop, the scoop including a concave partially cylindrical section suitable for receiving the barrel portion.

10. The computing device of claim 9, wherein the barrel portion to mechanically couple to the base in response to being placed in the scoop.

11. The computing device of claim 10, wherein the barrel portion and the scoop to comprise a grip for the apparatus, when the base is folded against the flat portion of the computing device casing and the barrel portion and scoop are mechanically coupled.

12. The computing device of claim 1, wherein the one or more batteries are cylindrical.

13. The computing device of claim 1, wherein the one or more batteries to be capable of supplying power to the one or more electronic components in the base when the base is at least electrically coupled to the barrel portion.

14. The computing device of claim 1, wherein the base couples to the barrel portion by wrapping at least partially around a rounded portion of the barrel portion.

15. The computing device of claim 1, wherein the base and casing are in wireless electrical communication with one another.

16. A computing device which is configurable to operate asunder and integrated, the computing device comprising:
   a casing including:
      a flat portion to house a display; and,
      a barrel portion securely affixed directly to one side of the flat portion, wherein the barrel portion is at least partially cylindrical, and wherein the barrel portion is wider than a thickness of the flat portion; and
   a base, the base including one or more electronic components, wherein the base is configured to removably couple, magnetically, to the casing;
   wherein, the one or more batteries to be capable of supplying power to the one or more electronic components in the base when the base is at least electrically coupled to the barrel portion.

17. The computing device of claim 16, wherein the flat portion protrudes along an entire length of the barrel portion.

18. The computing device of claim 16, wherein the barrel portion comprises a grip for the computing device casing.

19. The computing device of claim 16, wherein the base is capable of mechanically coupling and decoupling to the barrel portion.

20. The computing device of claim 16, wherein the base includes a scoop, the scoop including a concave partially cylindrical section suitable for receiving the barrel portion.

21. The computing device of claim 20, wherein the barrel portion to mechanically couple to the base in response to being placed in the scoop.

22. The computing device of claim 21, wherein the barrel portion and the scoop to comprise a grip for the apparatus, when the base is folded against the flat portion of the computing device casing and the barrel portion and scoop are mechanically coupled.

23. The computing device of claim 16, wherein the base couples to the barrel portion by wrapping at least partially around a rounded portion of the barrel portion.

24. The computing device of claim 16, wherein the base and casing are in wireless electrical communication with one another.

25. The computing system of claim 24, wherein the electrical communication is a Bluetooth protocol, at least in part.

* * * * *